(12) United States Patent
Svensson et al.

(10) Patent No.: US 10,287,970 B1
(45) Date of Patent: May 14, 2019

(54) FUEL INJECTION SYSTEM

(71) Applicant: Caterpillar Inc., Peoria, IL (US)

(72) Inventors: Kenth I. Svensson, Peoria, IL (US); Chad Palmer Koci, Washington, IL (US)

(73) Assignee: Caterpillar Inc., Deerfield, IL (US)

(*) Notice: Subject to any disclaimer, the term of this patent is extended or adjusted under 35 U.S.C. 154(b) by 0 days.

(21) Appl. No.: 15/834,618

(22) Filed: Dec. 7, 2017

(51) Int. Cl.
*F02B 23/00* (2006.01)
*F02B 23/02* (2006.01)

(52) U.S. Cl.
CPC .................................... *F02B 23/02* (2013.01)

(58) Field of Classification Search
CPC .. F02B 23/02; F02B 23/0645; F02B 23/0651; F02B 23/101; F02B 2023/103
USPC ................. 123/280, 285, 286, 298
See application file for complete search history.

(56) References Cited

U.S. PATENT DOCUMENTS

| | | | |
|---|---|---|---|
| 3,112,738 A | 12/1963 | Morris | |
| 3,132,633 A | 5/1964 | Zimmerman | |
| 3,295,506 A * | 1/1967 | Wisniowski | F02B 23/0651 123/276 |
| 3,775,039 A | 11/1973 | Pillard | |
| 4,473,185 A | 9/1984 | Peterson et al. | |
| 4,974,559 A | 12/1990 | Nagaoka | |
| 5,329,901 A * | 7/1994 | Onishi | F02B 9/06 123/254 |
| 5,388,985 A | 2/1995 | Musil et al. | |
| 5,425,337 A | 6/1995 | Matsuoka | |
| 5,522,357 A * | 6/1996 | Nogi | F02B 1/10 123/261 |
| 6,098,588 A * | 8/2000 | Hufnagel | F02B 23/04 123/261 |
| 6,848,635 B2 | 2/2005 | Xu | |
| 7,011,070 B2 | 3/2006 | Hill et al. | |
| 7,040,280 B1 * | 5/2006 | Drake | F02B 23/101 123/298 |
| 7,051,956 B2 | 5/2006 | Upatnieks | |
| 7,080,512 B2 | 7/2006 | Schoell | |
| 7,216,624 B2 | 5/2007 | Mizobuchi et al. | |
| 7,866,296 B2 * | 1/2011 | Schapiro | F01C 1/08 123/204 |
| 8,714,465 B2 | 5/2014 | Heyse et al. | |

(Continued)

FOREIGN PATENT DOCUMENTS

WO 2014000947 1/2014

OTHER PUBLICATIONS

Lyle M. Pickett, J. Javier Lopez, Jet-Wall Interaction Effects on Diesel Combustion and Soot Formation, 2005-01-0921, SAE100, SAE Technical Paper Series, 2005 SAE World Congress, Detroit, Michigan, Apr. 11-14, 2005. pp. 01-17.

*Primary Examiner* — Hai H Huynh
(74) *Attorney, Agent, or Firm* — Hibshman Claim Construction PLLC (57) ABSTRACT

A fuel injection system for an engine is provided. The fuel injection system includes a fuel injector adapted to inject at least one fuel jet within a combustion chamber of the engine. The fuel injection system also includes at least one plate disposed within the combustion chamber and in association with the at least one fuel jet. The at least one plate includes at least one opening provided therein. The at least one opening is adapted to at least partially allow passage of any one of the at least one fuel jet and a flame associated with the at least one fuel jet therethrough.

18 Claims, 11 Drawing Sheets

(56) References Cited

U.S. PATENT DOCUMENTS

| | | | |
|---|---|---|---|
| 8,776,760 B2* | 7/2014 | Stovell | F02B 23/0651 |
| | | | 123/298 |
| 9,157,403 B2 | 10/2015 | Saito et al. | |
| 9,506,439 B2* | 11/2016 | Anders | F02B 23/00 |
| 9,587,606 B2 | 3/2017 | Anders et al. | |
| 9,739,247 B2 | 8/2017 | Sumida et al. | |
| 9,803,538 B2* | 10/2017 | Anders | F02B 23/0627 |
| 9,909,549 B2* | 3/2018 | Mueller | F02M 61/14 |
| 9,915,190 B2* | 3/2018 | Koci | F02B 23/10 |
| 2004/0144870 A1 | 7/2004 | Tani et al. | |
| 2006/0260581 A1* | 11/2006 | Yoshimoto | F02B 17/005 |
| | | | 123/143 B |
| 2009/0206181 A1 | 8/2009 | Arndt et al. | |
| 2015/0211413 A1 | 7/2015 | Evans et al. | |

* cited by examiner

FUEL INJECTION SYSTEM

TECHNICAL FIELD

The present disclosure relates to a fuel injection system. More particularly, the present disclosure relates to the fuel injection system for an internal combustion engine.

BACKGROUND

An engine employing a direct-injection fuel system may typically inject one or more fuel jets, such as diesel fuel jets, into a combustion chamber of the engine. Each of the fuel jets may contact air present in the combustion chamber and may ignite into a flame during a combustion process. In many situations, the fuel jet may burn inefficiently and/or incompletely due to various factors, such as limited entrainment or mixing of air with the fuel jet, limited turbulence within the combustion chamber, limited flame combustion rate and/or soot oxidation, limited flame speed, and so on. In such a situation, the incomplete combustion and/or incomplete mixing of the fuel jet with the air may result in increased soot formation, increased emission, reduced fuel efficiency, higher equivalence ratio, increased service intervals, increased maintenance cost, and so on. Hence, there is a need for an improved fuel injection system.

U.S. Pat. No. 3,132,633 describes a piston assembly for an internal combustion engine having a fuel injection system and an injector nozzle. The assembly includes a piston head reciprocable in the engine and includes a spherical indentation in an upper surface thereof. The assembly also includes an insert secured in the indentation and includes a convex surface adjacent to the indentation to form a bowl-shaped pre-combustion chamber. The insert includes a central opening provided therein, aligned with the injector nozzle, and in communication with the pre-combustion chamber to provide a combustible mixture thereto for partial combustion therein. The insert also includes a plurality of orifices radially spaced from the central opening and in communication between the pre-combustion chamber and the upper surface of the piston head to provide the combustible mixture from the pre-combustion chamber.

SUMMARY OF THE DISCLOSURE

In an aspect of the present disclosure, a fuel injection system for an engine is provided. The fuel injection system includes a fuel injector adapted to inject at least one fuel jet within a combustion chamber of the engine. The fuel injection system also includes at least one plate disposed within the combustion chamber and in association with the at least one fuel jet. The at least one plate includes at least one opening provided therein. The at least one opening is adapted to at least partially allow passage of any one of the at least one fuel jet and a flame associated with the at least one fuel jet therethrough.

In another aspect of the present disclosure, an engine is provided. The engine includes an engine block and a cylinder head mounted on the engine block. The engine includes a combustion chamber disposed within the engine block and a piston movably disposed within the combustion chamber. The engine also includes a fuel injector provided in the cylinder head and in fluid communication with the combustion chamber. The fuel injector is adapted to inject at least one fuel jet within the combustion chamber. The engine further includes at least one plate disposed within the combustion chamber and in association with the at least one fuel jet. The at least one plate is coupled to any one of the cylinder head and the piston. The at least one plate includes at least one opening provided therein. The at least one opening is adapted to at least partially allow passage of any one of the at least one fuel jet and a flame associated with the at least one fuel jet therethrough.

In yet another aspect of the present disclosure, a method of injecting fuel within a combustion chamber associated with an engine is provided. The method includes providing at least one fuel jet within the combustion chamber. The method includes providing at least one plate in association with the at least one fuel jet within the combustion chamber. The at least one plate includes at least one opening provided therein. The method also includes at least partially passing any one of the at least one fuel jet and a flame associated with the at least one fuel jet through the at least one opening. The method further includes inducing turbulence in any one of the at least one fuel jet and the flame associated with the at least one fuel jet, respectively, downstream of the at least one plate.

Other features and aspects of this disclosure will be apparent from the following description and the accompanying drawings.

DETAILED DESCRIPTION

Figure 1:
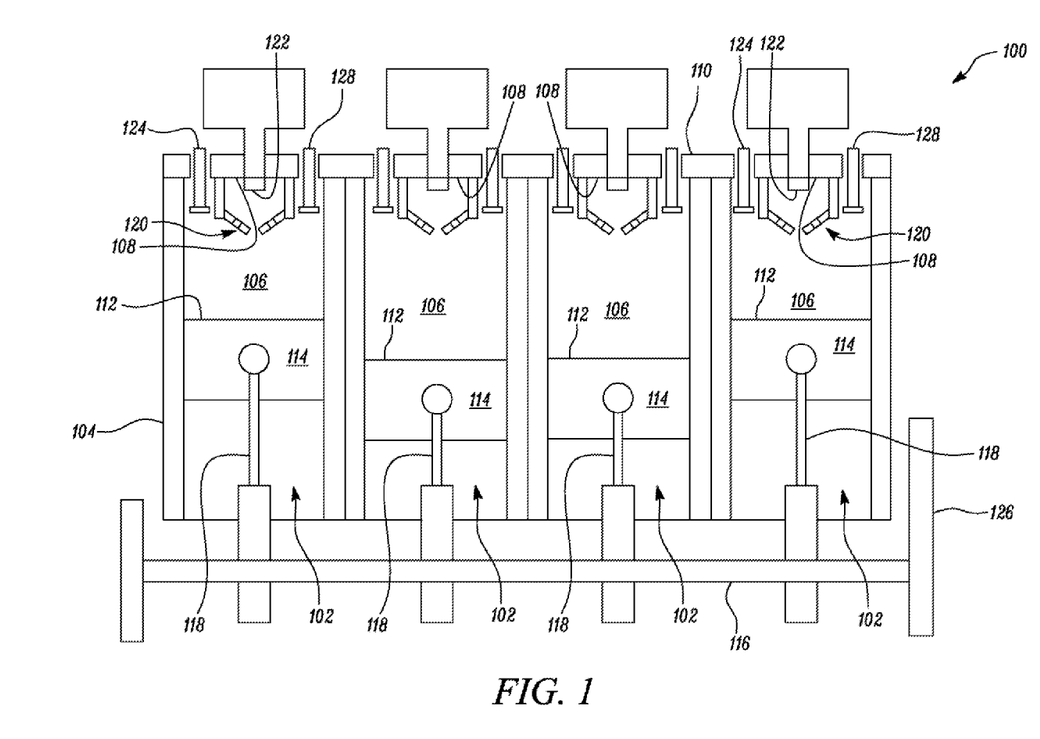
FIG. 1 is a schematic representation of an exemplary engine, according to one embodiment of the present disclosure.

Wherever possible, the same reference numbers will be used throughout the drawings to refer to the same or the like parts. Referring to FIG. 1, an exemplary engine 100 is illustrated. The engine 100 is an internal combustion engine having one or more cylinders 102 therein. For example, the cylinders 102 may be defined as cylinder bores within an engine block 104 of the engine 100. Each of the cylinders 102 includes a combustion chamber 106. The combustion chamber 106 may have a generally cylindrical shape, in accordance with the general shape of the cylinder 102. The combustion chamber 106 may be bound at one end by a flame deck surface 108 of a cylinder head 110. The combustion chamber 106 may be further bound at a second end by a top surface 112 of a piston 114. The piston 114 is reciprocally disposed within the cylinder 102 and is connected to a crankshaft 116 via a connecting rod 118.

The engine 100 also includes a fuel injection system 120 provided in association with the combustion chamber 106. The fuel injection system 120 may be hereinafter interchangeably referred to as the "system 120". The system 120 includes a fuel injector 122 provided in fluid communication with the combustion chamber 106 and is mounted in the cylinder head 110. The fuel injector 122 protrudes within the combustion chamber 106 through the flame deck surface 108. As such, the fuel injector 122 may directly inject fuel into the combustion chamber 106 as, for example, one or more fuel jets 202 (shown in FIG. 2). It should be noted that when more than one fuel jet 202 may be injected, each of the fuel jets 202 may be spaced spatially and/or temporally.

During operation of the engine 100, an intake charge, such as air, an oxidant, exhaust gas recirculation, a gaseous fuel, and so on, may enter the combustion chamber 106 via one or more intake valves 124. The intake charge may enter the combustion chamber 106 when the intake valves 124 may open, generally, during an intake stroke and/or at the end of an exhaust stroke and/or at the beginning of a compression stroke. When the intake charge may be present in the combustion chamber 106, the fuel injector 122 may inject high pressure fuel as the fuel jets 202. In the illustrated embodiment, the fuel injector 122 is shown injecting two fuel jets 202, such that each of the fuel jets 202 is disposed spaced apart with respect to one another. In other embodiments, the fuel injector 122 may inject single or multiple fuel jets 202 and in any orientation with respect to one another, based on application requirements.

Figure 2:
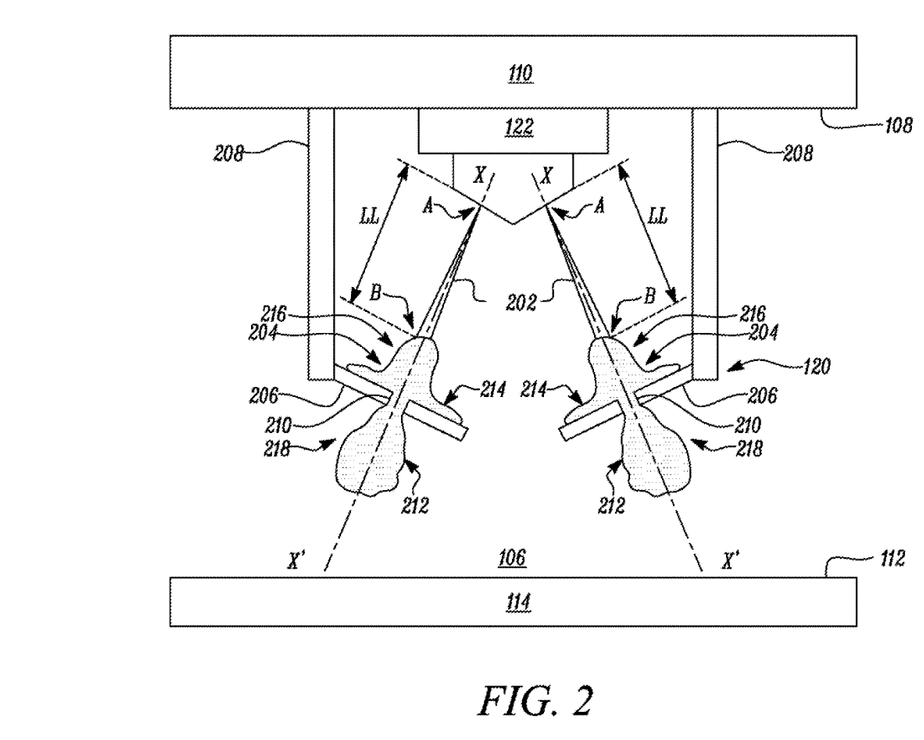
FIG. 2 is a schematic representation of a fuel injection system for the engine of FIG. 1, according to one embodiment of the present disclosure.

Each of the fuel jets 202 may entrain mostly air within the combustion chamber 106 to create an ignitable fuel and air mixture within the combustion chamber 106. Referring to FIG. 2, an ignition of each of the fuel jets 202 may create a respective flame 204. The flame 204 may result in a combustion process, which, in turn, may provide heat addition to the combustion chamber 106 and subsequent work on the piston 114 to produce motion upon the crankshaft 116 to drive an output 126 (shown in FIG. 1). Following the combustion process, exhaust gas may be expelled from the combustion chamber 106 via one or more exhaust valves 128 (shown in FIG. 1), when the exhaust valves 128 may open during the exhaust stroke and/or at the end of a power stroke and/or at the beginning of the intake stroke of the engine 100.

The system 120 also includes a plate 206 provided in association with each of the fuel jets 202 within the combustion chamber 106. In the illustrated embodiment, the plate 206 is fixedly coupled to the cylinder head 110 via a post 208. In other embodiments, the plate 206 may be coupled to the top surface 112 of the piston 114 via the post 208. In such a situation, the plate 206 may translate within the combustion chamber 106 along with the piston 114. Also, in the illustrated embodiment, the plate 206 is mounted within the combustion chamber 106 inclined with respect to the post 208 and substantially perpendicular with respect to a flame axis X-X' defined by the flame 204. In other embodiments, the plate 206 may be mounted within the combustion chamber 106 in any orientation, such as inclined with respect to the flame axis X-X', perpendicular with respect to the post 208, and so on, based on application requirements.

Additionally, in the illustrated embodiment, the plate 206 is disposed along the flame axis X-X' after a lift-off length "LL" of the fuel jet 202, such that the plate 206 interacts with the flame 204. The lift-off length "LL" may be defined as a linear distance between an injection point "A" of the fuel injector 122 and an ignition point "B" of the flame 204. In other embodiments, the plate 206 may be disposed at any location along the flame axis X-X', such as at the lift-off length "LL" or the ignition point "B", or before the lift-off length "LL", such that the plate 206 may interact with the fuel jet 202, and so on, based on application requirements. Each of the plate 206 and the fuel jet 202 may include varying configurations which will be explained later with reference to FIGS. 9A to 9F and FIGS. 10A and 10B respectively.

The plate 206 includes an opening 210 provided therein. The opening 210 is disposed in the plate 206 axially aligned with respect to the flame axis X-X'. The opening 210 is adapted to at least partially allow passage of the flame 204 associated with the fuel jet 202 therethrough. More specifically, in the illustrated embodiment, the plate 206 is disposed with respect to the flame 204, such that the opening 210 allows passage of a central portion 212 of the flame 204. Also, a remaining portion 214 of the flame 204 is redirected by the plate 206 away from the opening 210 on an upstream section 216 of the plate 206. In a situation when the plate 206 may be disposed before the lift-off length "LL", the plate 206 may be adapted to allow passage of a central portion (not shown) of the fuel jet 202 through the opening 210. Also, a remaining portion (not shown) of the fuel jet 202 may be redirected away from the opening 210 on the upstream section 216 of the plate 206.

Each of the plate 206 and the opening 210 therein provides to shear the flame 204 into multiple portions, such as the central portion 212 and the remaining portion 214. The central portion 212 may induce enhanced turbulence in the flame 204 on a downstream section 218 of the plate 206 and improved flame combustion rate and/or soot oxidation. The enhanced turbulence provides to induce quickly dispersing vortices which may provide improved air entrainment and, thus, improved combustion. Also, the remaining portion 214 of the flame 204 redirected on the upstream section 216 of the plate 206 may be spread over an extended area, in turn, providing improved air entrainment and, thus, improved rate of combustion.

Figure 3:
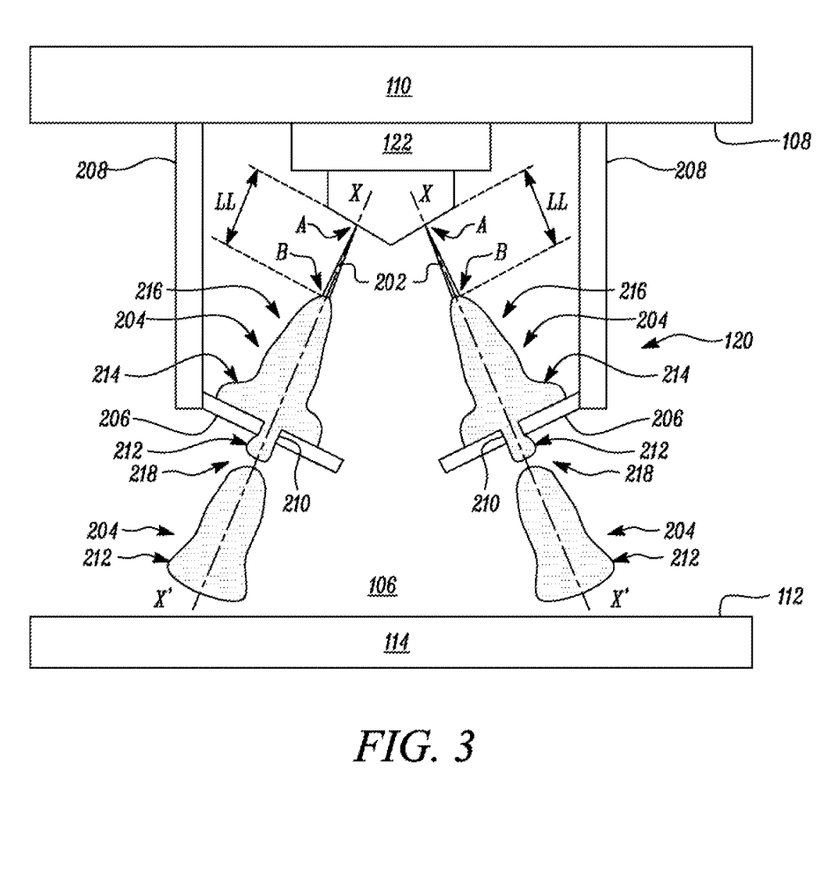
FIG. 3 is another schematic representation of the fuel injection system of FIG. 2, according to another embodiment of the present disclosure.

Referring to FIG. 3, in some embodiments, the fuel injector 122 may inject multiple smaller fuel jets 202 in place of a single long fuel jet. Accordingly, each of the smaller fuel jets 202 may result in formation of respective smaller flames 204. In such a situation, each of the plate 206 and the opening 210 therein may provide shearing of each of the smaller flames 204 in respective central portions 212 and remaining portions 214. As such, each of the multiple smaller flames 204 may be sheared down into yet smaller portions, thus, providing improved air entrainment and combustion in relation to shearing of single long flames formed from the single long fuel jet. In a situation when the plate 206 may be disposed before the lift-off length "LL", each of the plate 206 and the opening 210 may provide shearing of each of the smaller fuel jets 202 in multiple smaller portions.

Figure 4:
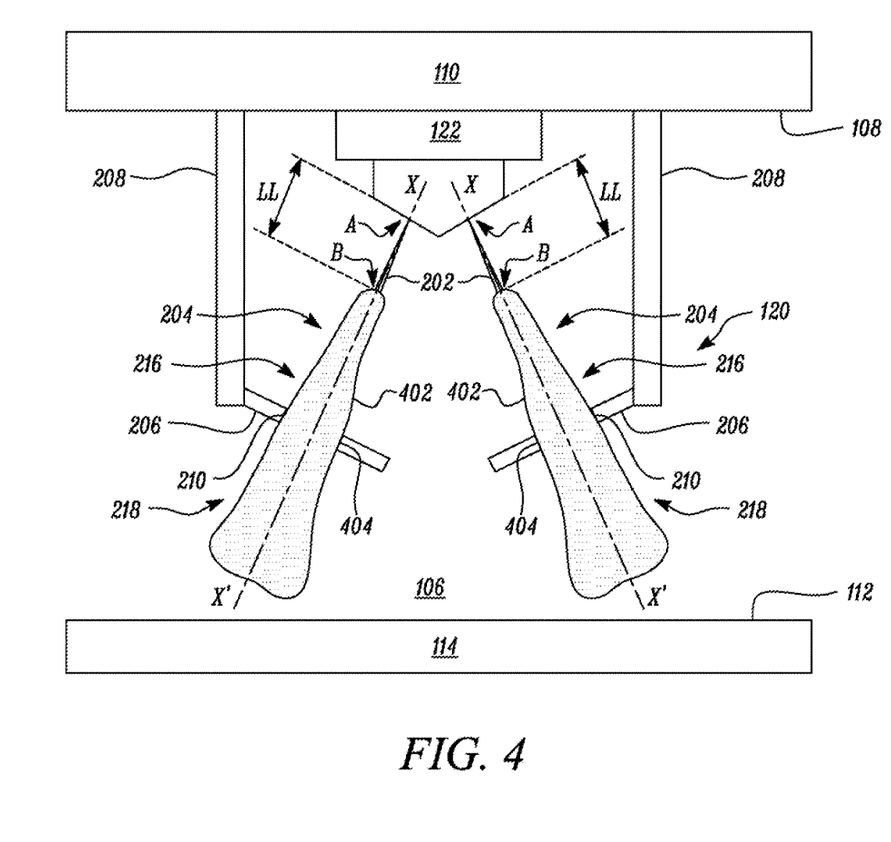
FIG. 4 is another schematic representation of the fuel injection system of FIG. 2, according to another embodiment of the present disclosure.

Referring to FIG. 4, in some embodiments, the plate 206 may be disposed within the combustion chamber 106, such that the opening 210 may allow passage of the single or multiple flames 204 completely therethrough. In such a situation, an edge 402 of the flame 204 may barely contact a periphery 404 of the opening 210. Accordingly, the opening 210 may provide to induce turbulence and quickly dispersing vortices in the flame 204 on the downstream section 218 of the plate 206. In a situation when the plate 206 may be disposed before the lift-off length "LL", the opening 210 may allow passage of the single or multiple fuel jets 202 completely through the opening 210. In such a situation, an edge (not shown) of the fuel jet 202 may barely contact the periphery 404 of the opening 210. Accordingly, the opening 210 may provide to induce turbulence and quickly dispersing vortices in the fuel jet 202 on the downstream section 218 of the plate 206.

Figure 5:
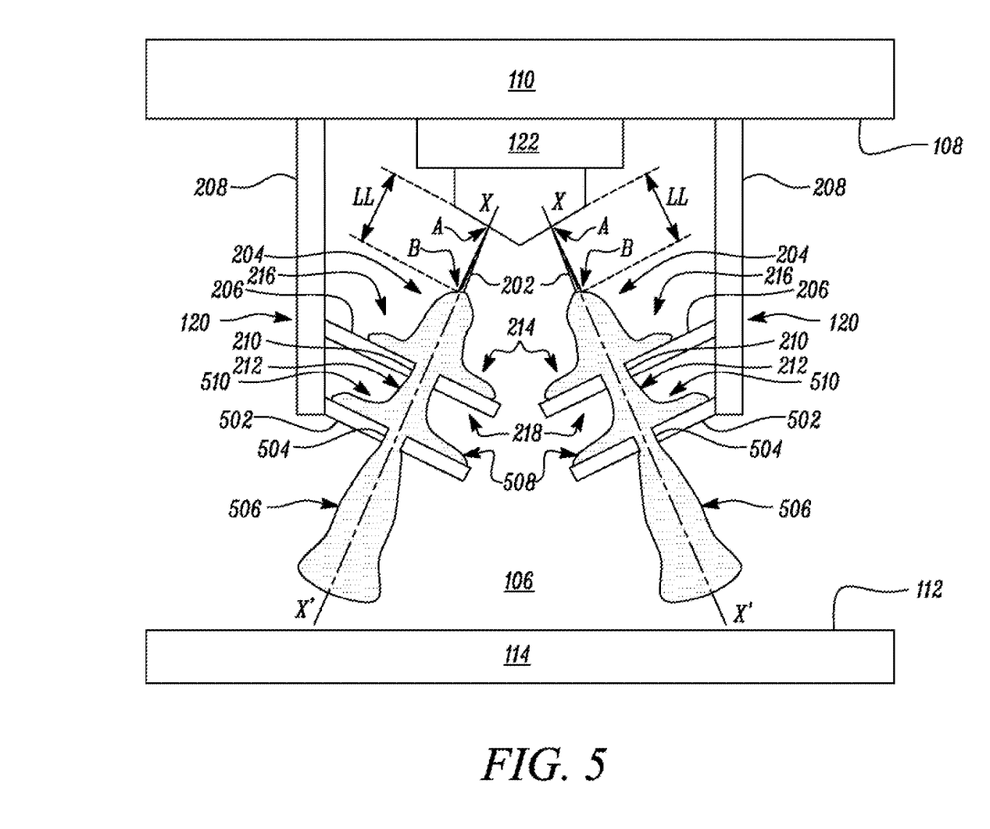
FIG. 5 is another schematic representation of the fuel injection system of FIG. 2, according to another embodiment of the present disclosure.

Referring to FIG. 5, in some embodiments, the system 120 may include an auxiliary plate 502 disposed within the combustion chamber 106. In the illustrated embodiment, the auxiliary plate 502 is coupled to the plate 206 via the post 208. In other embodiments, the auxiliary plate 502 may be coupled directly to the cylinder head 110 or the piston 114 via an auxiliary post (not shown). In the illustrated embodiment, the auxiliary plate 502 includes a configuration substantially similar to a configuration of the plate 206. In other embodiments, the configuration of the auxiliary plate 502 may vary with respect to the configuration of the plate 206, based on application requirements.

The auxiliary plate 502 also includes an auxiliary opening 504 provided therein. The auxiliary plate 502 is disposed along the flame axis X-X' and axially aligned with respect to the plate 206, such that the auxiliary opening 504 is also axially aligned with respect to the opening 210. Also, the auxiliary plate 502 is disposed substantially parallel and spaced apart with respect to the plate 206. In other embodiments, an orientation of the auxiliary plate 502 within the combustion chamber 106 and/or with respect to the plate 206 may vary, such as an angular orientation with respect to the plate 206, an inclination with respect to the plate 206, a linear distance with respect to the plate 206, and so on.

In the illustrated embodiment, the auxiliary opening 504 includes a configuration substantially similar to a configuration of the opening 210. In other embodiments, the configuration of the auxiliary opening 504 may vary with respect to the configuration of the opening 210, based on application requirements. The auxiliary opening 504 is adapted to at least partially allow passage of the central portion 212 of the single or multiple flames 204 associated with the single or multiple fuel jets 202 respectively therethrough. More specifically, in the illustrated embodiment, the auxiliary plate 502 is disposed with respect to the central portion 212 of the flame 204, such that the auxiliary opening 504 allows passage of a central body 506 of the central portion 212 of the flame 204 therethrough.

Also, a remaining body 508 of the central portion 212 of the flame 204 is redirected by the auxiliary plate 502 away from the auxiliary opening 504 on an upstream section 510 of the auxiliary plate 502. In the illustrated embodiment, a dimension or size of the auxiliary opening 504 is smaller with respect to a dimension or size of the opening 210. Accordingly, the auxiliary opening 504 provides to reduce an overall size of the central body 506 of the central portion 212 of the flame 204. In other embodiments, the dimension or size of the auxiliary opening 504 may be equal or greater with respect to the dimension or size of the opening 210. In such a situation, the auxiliary opening 504 may allow passage of the central portion 212 of the flame 204 completely therethrough as described in relation to FIG. 4.

It should be noted that, in other embodiments, the system 120 may include multiple auxiliary plates 502 disposed downstream of the plate 206. Also, in such a situation, respective auxiliary openings 504 of each of the auxiliary plates 502 may provide gradual shearing of the portion of flame 204 passing therethrough. This shearing of the flame 204 by the one or more auxiliary plates 502 and the respective auxiliary openings 504 therein may provide gradual reduction in flame size, induce enhanced turbulence, improved flame combustion rate and/or soot oxidation, improved air entrainment, and so on.

Figure 6:
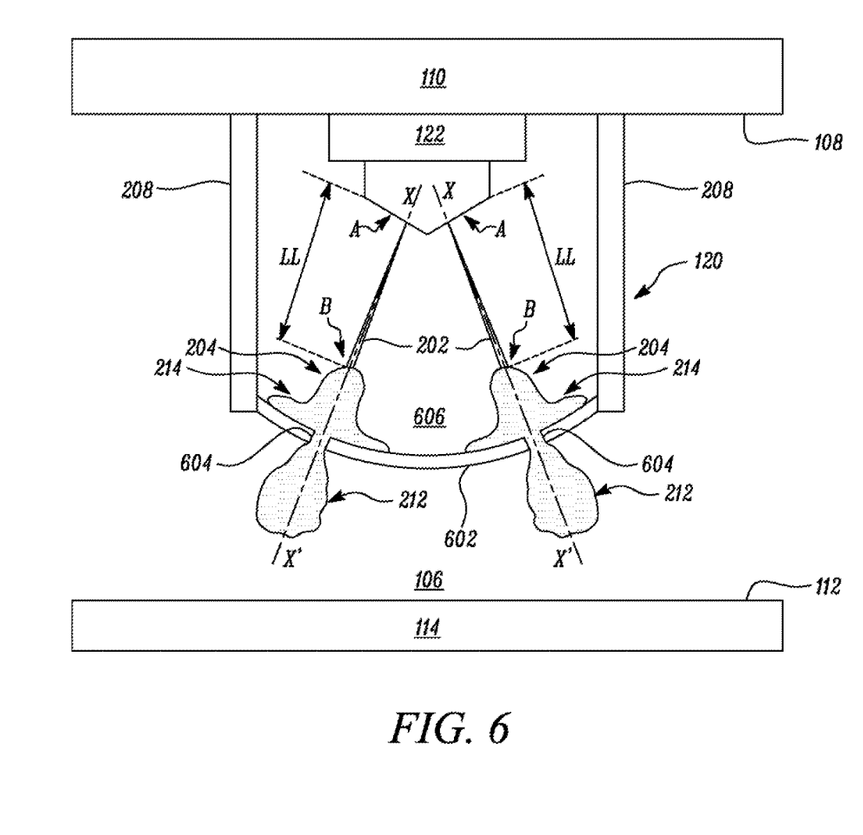
FIG. 6 is another schematic representation of the fuel injection system of FIG. 2, according to another embodiment of the present disclosure.

Referring to FIG. 6, in some embodiments, the system 120 may include a single plate 602 disposed within the combustion chamber 106 and in association with each of the fuel jets 202. In the illustrated embodiment, the single plate 602 is coupled to the cylinder head 110 via the post 208. In other embodiments, the single plate 602 may be coupled to the top surface 112 of the piston 114. The single plate 602 includes multiple openings 604 therein. Each of the multiple openings 604 is disposed spaced apart with respect to one another. Also, each of the multiple openings 604 is provided in association with each of the fuel jets 202 respectively.

In the illustrated embodiment, each of the multiple openings 604 is adapted to allow passage of the respective single or multiple flames 204 completely therethrough, or to allow passage of the central portion 212 of the respective single or multiple flames 204 therethrough and to redirect the remaining portion 214 of the respective single or multiple flames 204 away from the respective multiple openings 604 on an upstream section 606 of the single plate 602. In other embodiments when the single plate 602 may be disposed before the lift-off length "LL", each of the multiple openings 604 may be adapted to allow passage of the respective single or multiple fuel jets 202 completely therethrough, or to allow passage of the central portion of the respective single or multiple fuel jets 202 therethrough and to redirect the remaining portion of the respective single or multiple fuel jets 202 away from the respective multiple openings 604 on the upstream section 606 of the single plate 602.

Figure 7:
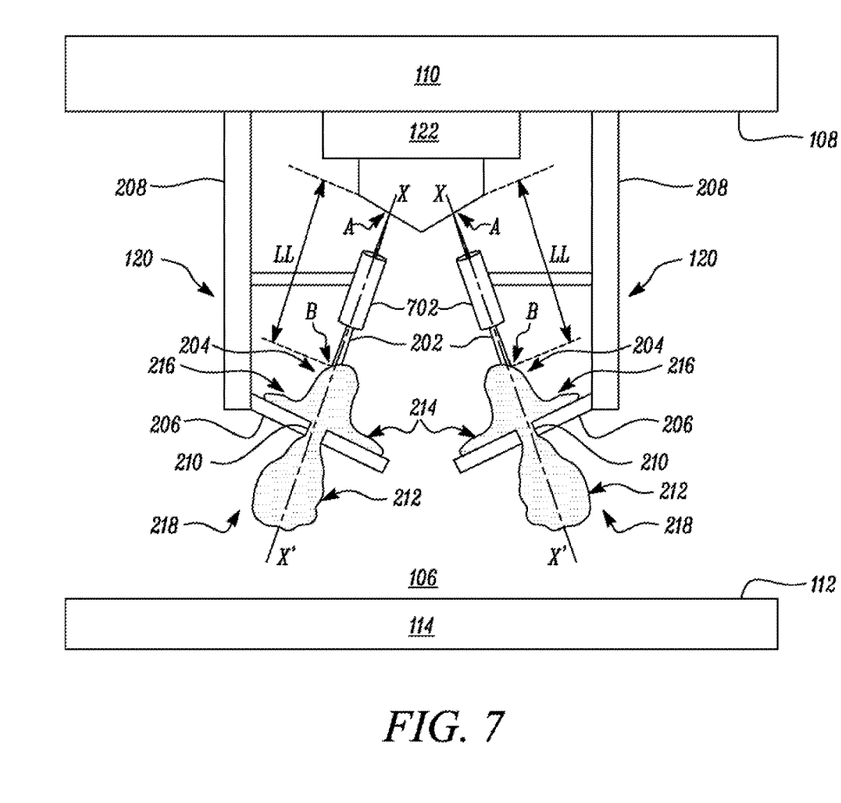
FIG. 7 is another schematic representation of the fuel injection system of FIG. 2, according to another embodiment of the present disclosure.

Referring to FIG. 7, in some embodiments, the system 120 may include a tubular duct 702 disposed within the combustion chamber 106 and in association with the plate 206. More specifically, the tubular duct 702 is provided on the upstream section 216 of the plate 206 and axially aligned with respect to the flame axis X-X' and the opening 210. In the illustrated embodiment, the tubular duct 702 is coupled to the cylinder head 110 via the post 208. In other embodiments, the tubular duct 702 may be coupled to the top surface 112 of the piston 114 along with the plate 206. The tubular duct 702 is adapted to allow passage of the single or multiple fuel jets 202 therethrough.

As such, the tubular duct 702, based on a length thereof, may provide to increase the lift-off length "LL" of the fuel jet 202, and/or may provide to induce enhanced turbulence in the fuel jet 202 and/or the flame 204 downstream of the tubular duct 702. The fuel jet 202 may ignite, and the flame 204 may be formed downstream of the tubular duct 702 and on the upstream section 216 of the plate 206. The plate 206 and the opening 210 may provide shearing of the flame 204 into the central portion 212 and the remaining portion 214, such that the central portion 212 may pass through the opening 210 and the remaining portion 214 may be redirected on the upstream section 216 of the plate 206 as described in relation to FIGS. 2, 3, 5, and 6.

Additionally, or optionally, in some embodiments, the auxiliary plate 502 may also be provided on the downstream section 218 of the plate 206 as described in relation to FIG. 5. In some embodiments, the plate 206 may be replaced with the single plate 602 as described in relation to FIG. 6 with separate tubular ducts (not shown) provided in association with the each of the fuel jets 202 respectively. Also, in some embodiments, the plate 206 or the auxiliary plate 502, as the case may be, may be disposed such that the flame 204 may pass completely through the opening 210 or the auxiliary opening 504 therein, respectively, as described in relation to FIG. 4.

Figure 8:
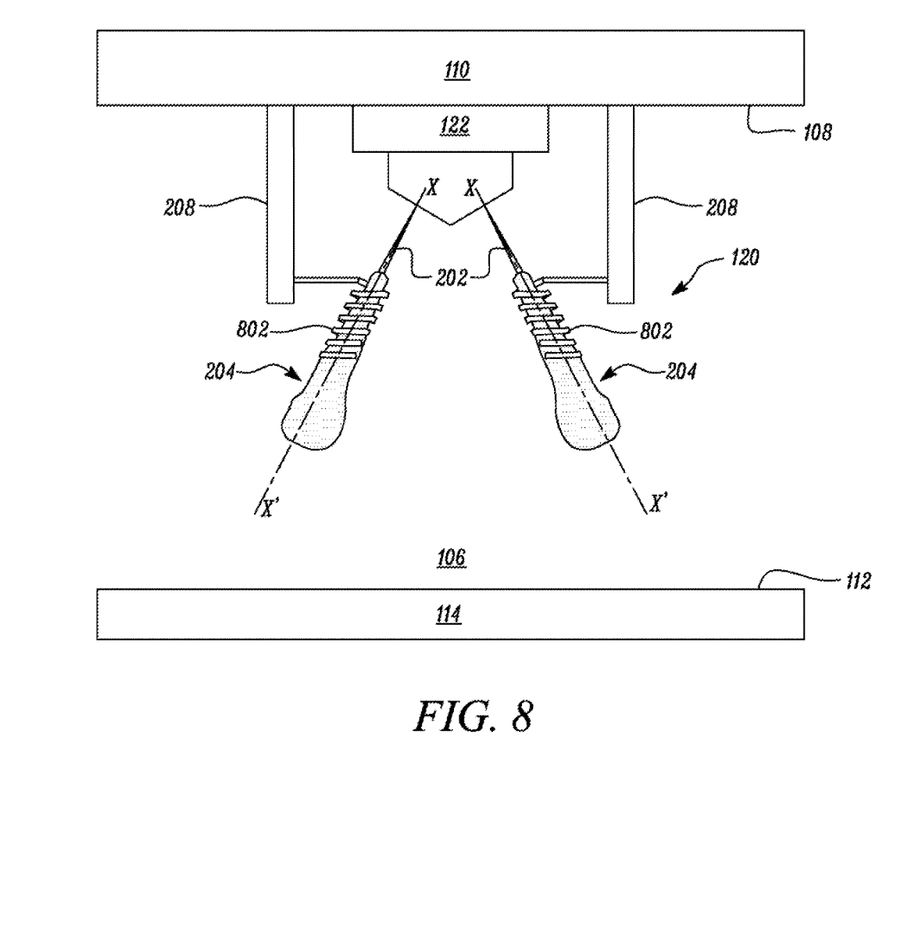
FIG. 8 is another schematic representation of the fuel injection system of FIG. 2, according to another embodiment of the present disclosure.

Referring to FIG. 8, in some embodiments, the system 120 may include a spiral duct 802 disposed within the combustion chamber 106. The spiral duct 802 is disposed axially aligned with respect to the flame axis X-X' of each of the fuel jets 202. In the illustrated embodiment, the spiral duct 802 is coupled to the cylinder head 110 via the post 208. In other embodiments, the spiral duct 802 may be coupled to the top surface 112 of the piston 114. The spiral duct 802 may have any configuration, such as asymmetric or axisymmetric, based on application requirements. The spiral duct 802 is adapted to allow passage of the single or multiple fuel jets 202 and/or the single or multiple flames 204 therethrough. Accordingly, the spiral duct 802 is adapted to induce turbulence in the fuel jet 202 and/or the flame 204 passing therethrough, in turn, improving air entrainment and improved combustion.

Figure 9A:
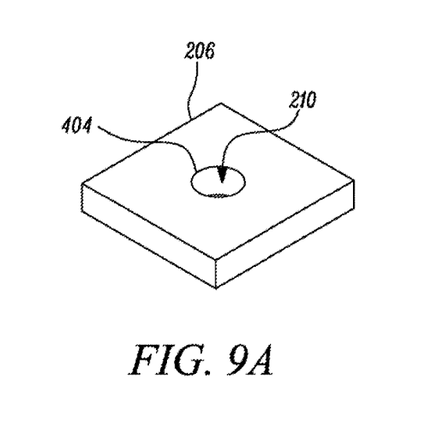
FIGS. 9A to 9F show different configurations of a portion of the fuel injection system of FIG. 2, according to various embodiments of the present disclosure.
Figures 9B, 9E:
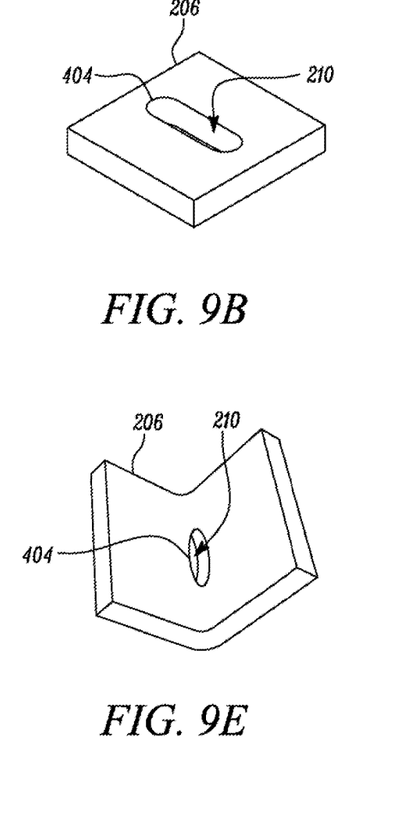
Figures 9C, 9F:
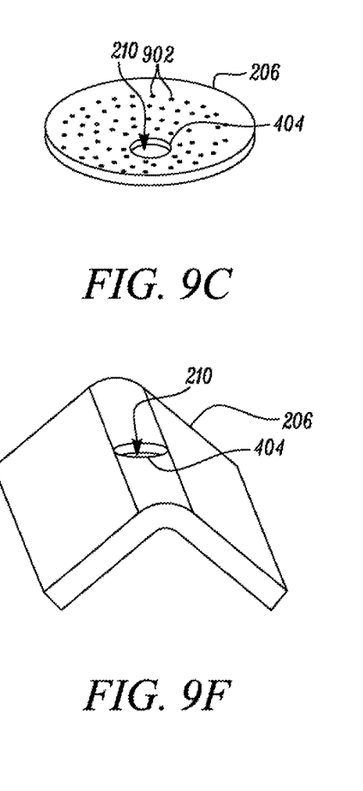
Figure 9D:
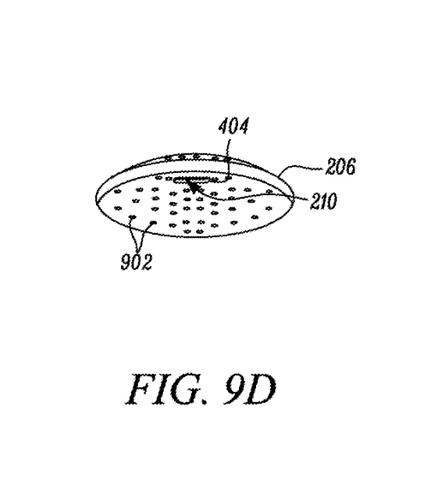

Referring to FIGS. 9A to 9F, different exemplary configurations of the plate 206 are illustrated. In some embodiments, as shown in FIGS. 9A and 9B, the plate 206 may have a substantially flat configuration. In some embodiments, as shown in FIGS. 9C and 9D, the plate 206 may have a substantially curved configuration, such as a concave configuration, a convex configuration, and so on. In some embodiments, as shown in FIGS. 9E and 9F, the plate 206 may have a substantially angled configuration. Also, the plate 206 may have a substantially rectangular configuration, as shown in FIGS. 9A and 9B, or a substantially circular configuration, as shown in FIGS. 9C and 9D.

Also, in some embodiments, as shown in FIGS. 9A and 9C, the opening 210 may have a substantially circular configuration. In some embodiments, as shown in FIGS. 9B and 9D, the opening 210 may have a substantially non-circular configuration, such as a slot. In some embodiments, as shown in FIGS. 9E and 9F, the opening 210 may have the substantially non-circular configuration, such as elliptical, and so on. In some embodiments, as shown in FIGS. 9C and 9D, the plate 206 may include multiple perforations 902 therein. Each of the perforations 902 may allow passage of air therethrough, such as to provide air for combustion of the redirected remaining portion 214 of the flame 204 and/or the fuel jet 202 on the upstream section 216 of the plate 206.

In some embodiments (not shown), the plate 206 may be manufactured using a permeable material, such as a mesh type element, an oxygen permeable material, an air permeable material, and so on. It should be noted that the configurations of the plate 206 described in relation to FIGS. 9A to 9F, and/or the material for the plate 206 may be, additionally, or optionally, be utilized for the auxiliary plate 502, and/or the single plate 602. Also, it should be noted that the configuration of the plate 206 and the opening 210 described herein are merely exemplary, may vary, and may include other structural, dimensional, and/or cross-sectional configuration not described herein, based on application requirements. For example, in the illustrated embodiment, the periphery 404 of the opening 210 includes a sharp-edged configuration. In other embodiments, the periphery 404 of the opening 210 may include any other configuration, such as a chamfered configuration, a beveled configuration, a filleted configuration, and so on. Also, a dimension of the opening 210, such a radius thereof, a length thereof, a width thereof, a thickness thereof, and so on, may vary based on application requirements.

The configuration of each of the plate 206 and the opening 210 may be interchanged in any other combination not described herein, based on application requirements. Further, it should be noted that various combinations may be possible by interchanging and/or combining the various embodiments of the plate 206, the auxiliary plate 502, the single plate 602, the tubular duct 702, and/or the spiral duct 802 with one another not described herein, based on application requirements.

Figure 10A:
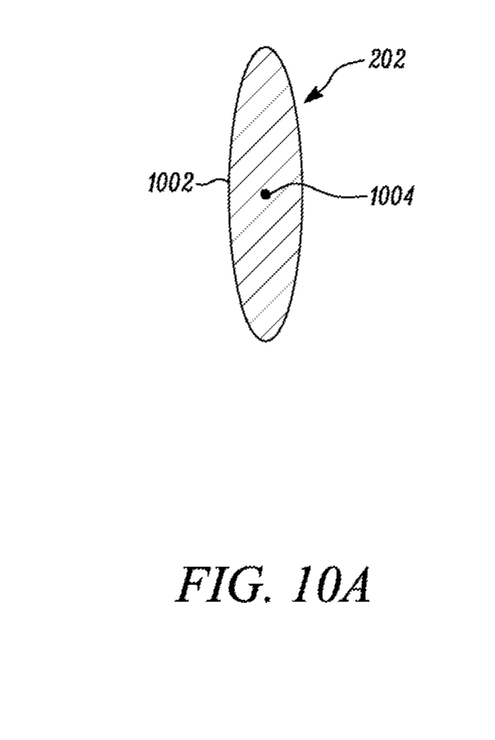
FIGS. 10A and 10B illustrate different configurations of a fuel jet provided by the fuel injection system of FIG. 2, according to various embodiments of the present disclosure.
Figure 10B:
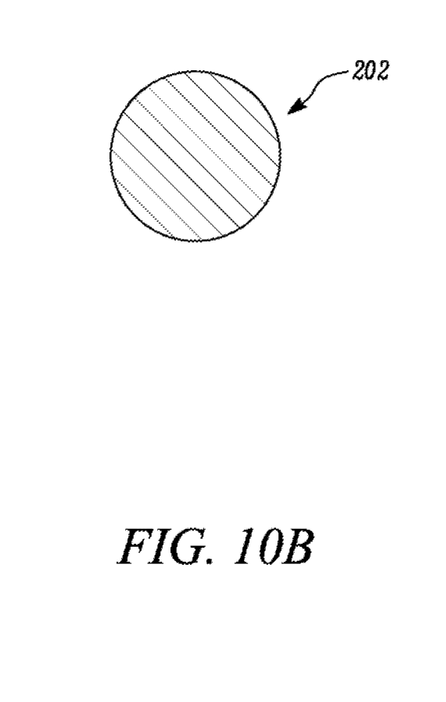

Referring to FIGS. 10A and 10B, different configurations of the fuel jets 202 are illustrated. In some embodiments, as shown in FIG. 10A, one or more of the fuel jets 202 may include a substantially non-circular configuration, such as elongated, elliptical, and so on. The elongated configuration may provide increased surface area of the respective fuel jet 202 and/or a reduced distance from an edge 1002 of the fuel jet 202 to a center 1004 of the fuel jet 202 to be entrained with the air and/or to induce vortices therein for improved combustion. In some embodiments, as shown in FIG. 10B, one or more of the fuel jets 202 may include a substantially circular configuration.

INDUSTRIAL APPLICABILITY

Figure 11:
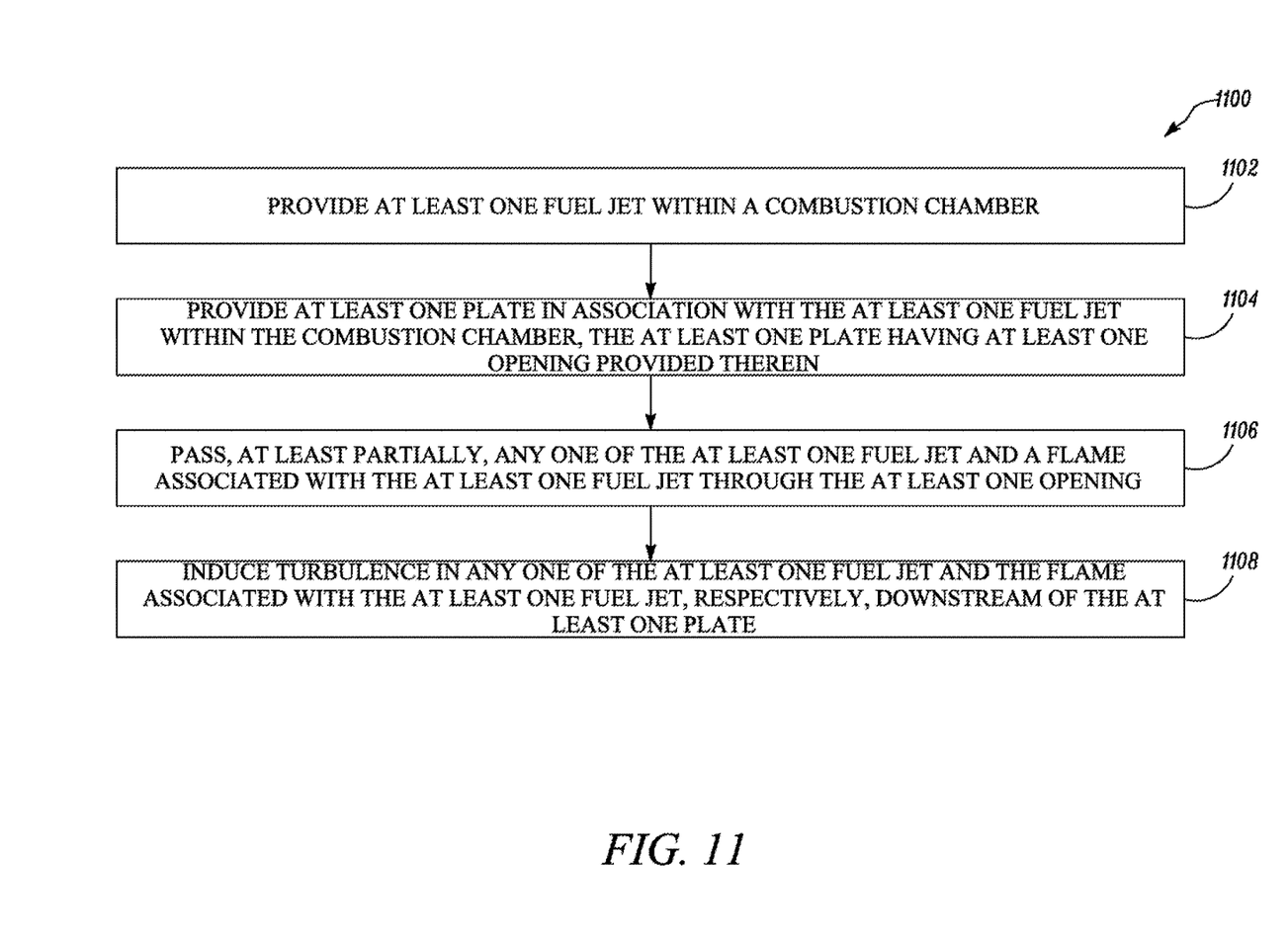
FIG. 11 is a flowchart illustrating a method of working of the fuel injection system of FIG. 2, according to an embodiment of the present disclosure.

The present disclosure relates to a method 1100 of the fuel injection system 120. Referring to FIG. 11, a flowchart of the method 1100 is illustrated. More specifically, the flowchart illustrates the method 1100 of injecting fuel within the combustion chamber 106 of the chamber using the system 120. At step 1102, one or more fuel jets 202 are provided within the combustion chamber 106 via the fuel injector 122. The fuel jet 202 may have any configuration, as shown in FIGS. 10A and 10B. At step 1104, one or more plates 206 are provided within the combustion chamber 106, such that each of the plates 206 is in association with each of the fuel jets 202 respectively. In some embodiments, as shown in FIG. 7, the tubular duct 702 may be provided on the upstream section 216 of the plate 206, such that the fuel jet 202 may pass therethrough prior to interaction with the plate 206.

The plate 206 includes the opening 210 provided therein, such that the opening 210 is axially aligned with respect to the flame axis X-X'. At step 1106, the flame 204 associated with the fuel jet 202 is at least partially passed through the respective opening 210. More specifically, in some embodiments, as shown in FIGS. 2, 3, 5, 6, and 7, the flame 204 is sheared by the plate 206 and the opening 210, such that the central portion 212 of the flame 204 is passed through the opening 210 and the remaining portion 214 of the flame 204 is redirected away from the opening 210 on the upstream section 216 of the plate 206.

In some embodiments, as shown in FIG. 4, the flame 204 is completely passed through the opening 210 provided in the plate 206. In some embodiments when the plate 206 may be disposed before the lift-off length "LL", the opening 210 may allow passage of the fuel jet 202 completely or partially, based on application requirements. At step 1108, turbulence is induced in the flame 204 on the downstream section 218 of the plate 206. More specifically, turbulence is induced in the flame 204 due to a combination of shearing of the flame 204 into the central portion 212 and the remaining portion 214, and passage of the central portion 212 of the flame 204 through the restricted opening 210. In some embodiments when the plate 206 may be disposed within the combustion chamber 106 such that the plate 206 may interact with the fuel jet 202, turbulence may be induced in the fuel jet 202 or the flame 204 on the downstream section 218 of the plate 206.

The system 120 provides a simple and efficient method of injecting fuel into the combustion chamber 106 of the engine 100. The system 120 provides various embodiments of arrangement and/or configuration of each of the plate 206, the auxiliary plate 502, the single plate 602, the tubular duct 702, the spiral duct 802, the opening 210, 604, and the fuel jet 202 to be employed within the combustion chamber 106 in order to induce enhanced turbulence in the flame 204/fuel jet 202, increase quickly dispersing vortices in the flame 204/fuel jet 202, improve flame combustion rate and/or soot oxidation, and so on.

As such, the system 120 may provide to improve air entrainment into the flame 204/fuel jet 202, thus, providing improved combustion, improved heat release, lower equivalence ratio, reduced soot emission, improved fuel efficiency, and so on, without employing complex electronic/mechanical control systems, complex piston geometries, complex combustion chamber geometries, and so on. Also, the system 120 may be retrofitted in any engine with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A fuel injection system for an engine, the fuel injection system comprising:
   a fuel injector fluidly coupled to a combustion chamber of the engine and defining a plurality of fuel jet outlets, the fuel injector being configured to directly inject a plurality of fuel jets from the plurality of fuel jet outlets within the combustion chamber, a first fuel jet outlet of the plurality of fuel jet outlets being arranged to inject a first fuel jet of the plurality of fuel jets along a first flame axis;
   a first plate disposed within the combustion chamber, the first plate defining a first opening therethrough, the first flame axis passing through the first opening; and
   a second plate disposed within the combustion chamber, the second plate defining a second opening therethrough, the first flame axis passing through the second opening,
   the first plate being disposed between the second plate and the fuel injector along the first flame axis,
   the first opening and the second opening being configured to pass at least a portion of the first fuel jet therethrough.

2. The fuel injection system of claim 1, wherein the first opening of the first plate is arranged to pass a central portion of the first fuel jet therethrough, and redirect a remaining portion of the first fuel jet away from the first opening upstream of the first plate along the first flame axis.

3. The fuel injection system of claim 1, wherein:
   a second fuel jet outlet of the plurality of fuel jet outlets is arranged to inject a second fuel jet of the plurality of fuel jets along a second flame axis, the second flame axis being distinct from the first flame axis, and
   the first plate further defines a third opening therethrough, the second flame axis passing through the third opening.

4. The fuel injection system of claim 3, wherein the second plate further defines a fourth opening therethrough, the second flame axis passing through the fourth opening, and
   the first plate is disposed between the second plate and the fuel injector along the second flame axis.

5. The fuel injection system of claim 1, further comprising a tubular duct disposed between the first plate and the fuel injector along the first flame axis, the tubular duct having an internal surface defining a duct flow path therethrough, the first flame axis passing through the duct flow path.

6. The fuel injection system of claim 1, wherein the first opening has a non-circular cross-sectional shape.

7. The fuel injection system of claim 1, wherein the first plate includes at least one of a flat configuration, a curved configuration, an angled configuration, and a spiral configuration.

8. The fuel injection system of claim 1, wherein the first plate includes at least one of a plurality of perforations defined therethrough and a permeable material.

9. The fuel injection system of claim 1, wherein the first opening has a circular cross-sectional shape.

10. The fuel injection system of claim 1, wherein the first plate is coupled to one of a cylinder head of the engine and a piston of the engine.

11. An engine comprising:
    an engine block;
    a cylinder head mounted on the engine block;
    a combustion chamber defined within the engine block;
    a piston movably disposed within the combustion chamber;
    a fuel injector fluidly coupled to the combustion chamber and defining a plurality of fuel jet outlets, the fuel injector being configured to directly inject a plurality of fuel jets from the plurality of fuel jet outlets within the combustion chamber, a first fuel jet outlet of the plurality of fuel jet outlets being arranged to inject a first fuel jet of the plurality of fuel jets along a first flame axis;
    a first plate disposed within the combustion chamber, the first plate defining a first opening therethrough, the first flame axis passing through the first opening, the first plate being coupled to one of the cylinder head and the piston; and
    a second plate disposed within the combustion chamber, the second plate defining a second opening therethrough, the first flame axis passing through the second opening,
    the first plate being disposed between the second plate and the fuel injector along the first flame axis,
    the first opening and the second opening being configured to pass at least a portion of the first fuel jet therethrough.

12. The engine of claim 11, wherein the first opening of the first plate is arranged to pass a central portion of the first fuel jet, and redirect a remaining portion of the first fuel jet away from the first opening upstream of the first plate along the first flame axis.

13. The engine of claim 11, wherein:
   a second fuel jet outlet of the plurality of fuel jet outlets is arranged to inject a second fuel jet of the plurality of fuel jets along a second flame axis, the second flame axis being distinct from the first flame axis, and
   the first plate further defines a third opening therethrough, the second flame axis passing through the third opening.

14. The engine of claim 13, wherein the second plate further defines a fourth opening therethrough, the second flame axis passing through the fourth opening, and
   the first plate is disposed between the second plate and the fuel injector along the second flame axis.

15. The engine of claim 11 further comprising a tubular duct disposed between the first plate and the fuel injector along the first flame axis, the tubular duct having an internal surface defining a duct flow path therethrough, the first flame axis passing through the duct flow path.

16. The engine of claim 11, wherein the first plate includes at least one of a plurality of perforations defined therethrough and a permeable material.

17. A method for injecting fuel within a combustion chamber of an engine, the method comprising:
   injecting, via a fuel injector, a fuel jet directly within the combustion chamber and along a flame axis;
   passing a portion of the fuel jet through a first opening through a first plate disposed within the combustion chamber;
   passing the portion of the fuel jet through a second opening through a second plate disposed within the combustion chamber, the first plate being located between the second plate and the fuel injector along the flame axis; and
   inducing turbulence in the portion of the fuel jet between the first plate and the second plate along the flame axis.

18. The method of claim 17, further comprising:
   passing a central portion of the fuel jet through the first opening; and
   redirecting a remaining portion of the fuel jet away from the first opening upstream of the first plate along the flame axis.

* * * * *